United States Patent [19]

Isidoro et al.

[11] Patent Number: 5,440,563

[45] Date of Patent: Aug. 8, 1995

[54] SERVICE CIRCUIT ALLOCATION IN LARGE NETWORKS

[75] Inventors: Alessandro L. Isidoro, Howell, N.J.; Vikram Punj, Naperville, Ill.

[73] Assignee: AT&T Corp., Murray Hill, N.J.

[21] Appl. No.: 135,106

[22] Filed: Oct. 12, 1993

[51] Int. Cl.$^6$ .............................................. H04J 3/12
[52] U.S. Cl. .................. 370/110.1; 379/219; 379/229; 370/60.1
[58] Field of Search ............... 370/62, 94.1, 110.1, 370/60.1; 379/90, 219, 229, 201, 157

[56] References Cited

U.S. PATENT DOCUMENTS

| | | | |
|---|---|---|---|
| 4,567,323 | 1/1986 | Lottes et al. | 379/201 |
| 4,720,850 | 1/1988 | Oberlander et al. | 379/90 |
| 4,748,658 | 5/1988 | Gopal et al. | 379/221 |
| 5,065,392 | 11/1991 | Sibbit et al. | 370/58.2 |
| 5,193,110 | 3/1993 | Jones et al. | 379/94 |

OTHER PUBLICATIONS

New Recommendation Q.1205, "Intelligent Network Physical Plane Architecture", Geneva, 10–17 Mar. 1992, pp. 1–8.
New Recommendation Q.1215, "Physical Plane for Intelligent Network CS-1", Geneva, 10–17 Mar. 1992, pp. 1–10.

*Primary Examiner*—Douglas W. Olms
*Assistant Examiner*—Russell W. Blum
*Attorney, Agent, or Firm*—Werner Ulrich

[57] ABSTRACT

An arrangement for pooling service circuits so that they become available to a plurality of switching systems in a telecommunications network. A regional control node receives a request for a service circuit to be connected to a call. The regional control node maintains the availability status of the service circuits in a pool for the region. In response to a request for a service circuit, the regional control node selects an appropriate circuit and transmits order to the switches and the circuit to establish the proper connections among these units in order to associate the service circuit with the requesting call. Advantageously, such an arrangement permits a large pool of individually expensive service circuits to serve a large number of switching systems, thus, increasing the efficiency of utilization of these service circuits. The arrangement is also used for controlling the allocation of transmission resources to any call, thus optimizing the use of the regional transmission resources.

6 Claims, 4 Drawing Sheets

SERVICE CIRCUIT ALLOCATION IN LARGE NETWORKS

TECHNICAL FIELD

This invention relates to arrangements for pooling and allocating service circuits to telecommunication calls, especially those calls requiring service circuits which are not available at the switches used in the primary connections.

PROBLEM

As telecommunication services become increasingly complex, they frequently require the use of one or more auxiliary service circuits. Examples of such service circuits are conference bridges for voice, for video, broadcast bridges for one-way video, for facsimile, or control circuits and data links for accessing value added servers for network based services using layers 4–7 of the International Standards Organization (ISO) protocol stack; the latter would include access to Library of Congress data, electronic newspapers, shop at home networks, etc. In the past, this type of situation has not been a problem since the service circuits were sufficiently inexpensive that a group of such circuits adequate to serve the needs of a switching system were normally provided in that switching system. However, some of the service circuits discussed are quite expensive (for example, High Definition Television (HDTV), video conference bridges) so that it is necessary to have especially efficient use of such circuits, an efficiency usually obtainable only through the use of large groups of these circuits. Individual switches cannot use such large groups economically. More generally, the allocation of transmission resources (bandwidth, individual trunks) even for calls not requiring the use of specialized expensive service circuits is not optimum in prior art telecommunications networks.

SOLUTION

In accordance with the principles of our invention, service circuits are available to a group of switching systems through a mechanism which offers a centralized control of the allocation of these service circuits. In one specific embodiment of the invention, a regional master allocator and control, known as a Regional Control Node (RCN), receives requests for these service circuits and allocates individual service circuits to the requesting calls for all calls in that region comprising a plurality of switching systems. The RCN relies on a topology manager and a resource manager to select an available service circuit. The resource manager is informed when a service circuit becomes available, initially when the circuit is placed in service, thereafter because of a completion of a communication or because the service circuit is no longer needed in a particular communication, and thus is able to maintain the busy/idle status and the quantity of resources (e.g., bandwidth used by each of the service circuits. Similarly, the topology manager has a map of the network topology. This includes a map of all switches, crossconnect systems, and service circuits, as well as connectivity including the number of links required to access the service circuits and trunk groups needed to access these circuits. The RCN manages a plurality of groups of different service circuits, for example, CD quality audio conference bridges, HDTV video conference bridges, video broadcast servers, etc., and can allocate several service circuits to a particular communication. This is particularly useful for multi-media calls that need different resources for a call, and/or need different sets of resources at different stages of the call. It is also possible to optimize the call by routing connections over different paths to different bridges. Advantageously, since the RCN maintains data of the availability of service circuits, complex connection will not be established unless all key service circuits are not available. Advantageously, this arrangement allows a large pool of service circuits to serve a plurality of switches. Advantageously, individual service circuits can be added in such a way as to benefit all switching systems of a region. Advantageously, because the dynamic network topology is centrally controlled, changing traffic patterns will affect circuit availability minimally. Advantageously, this arrangement decouples the expensive service circuits from host switches both in control and function thus making them equally available to all the switches of a region. Advantageously, the regional control node can take advantage of very high speed and/or massively parallel processors to control a large number of service circuits in conjunction with a large number of calls without affecting the capacity of the switches served by the regional control node. Advantageously, very high speed communication links can be used to connect the service circuits via asynchronous transfer mode (ATM) crossconnect systems (not full function switches) to a plurality of network switches; even though the ATM crossconnect has provisioned permanent virtual circuits, i.e., effectively trunk groups, bandwidth is only used when the virtual circuits become active and is only used to the extent that the virtual circuits require the bandwidth. Advantageously, this arrangement allows orderly and modular growth in the number of service circuits provided for a region without requiring that the traffic patterns of the region be taken into account. Advantageously, this arrangement is able to react to sudden surges in demand for the service circuits in one or more of the switches in the region because the pool of service circuits is available to all the switches. More generally, the RCN is used to maintain records of the availability of transmission resources and to allocate them for telecommunication calls as needed. Advantageously, this arrangement provides for a centralized, therefore more optimum, allocation of such resources.

DRAWING DESCRIPTION

DETAILED DESCRIPTION

Figure 1:
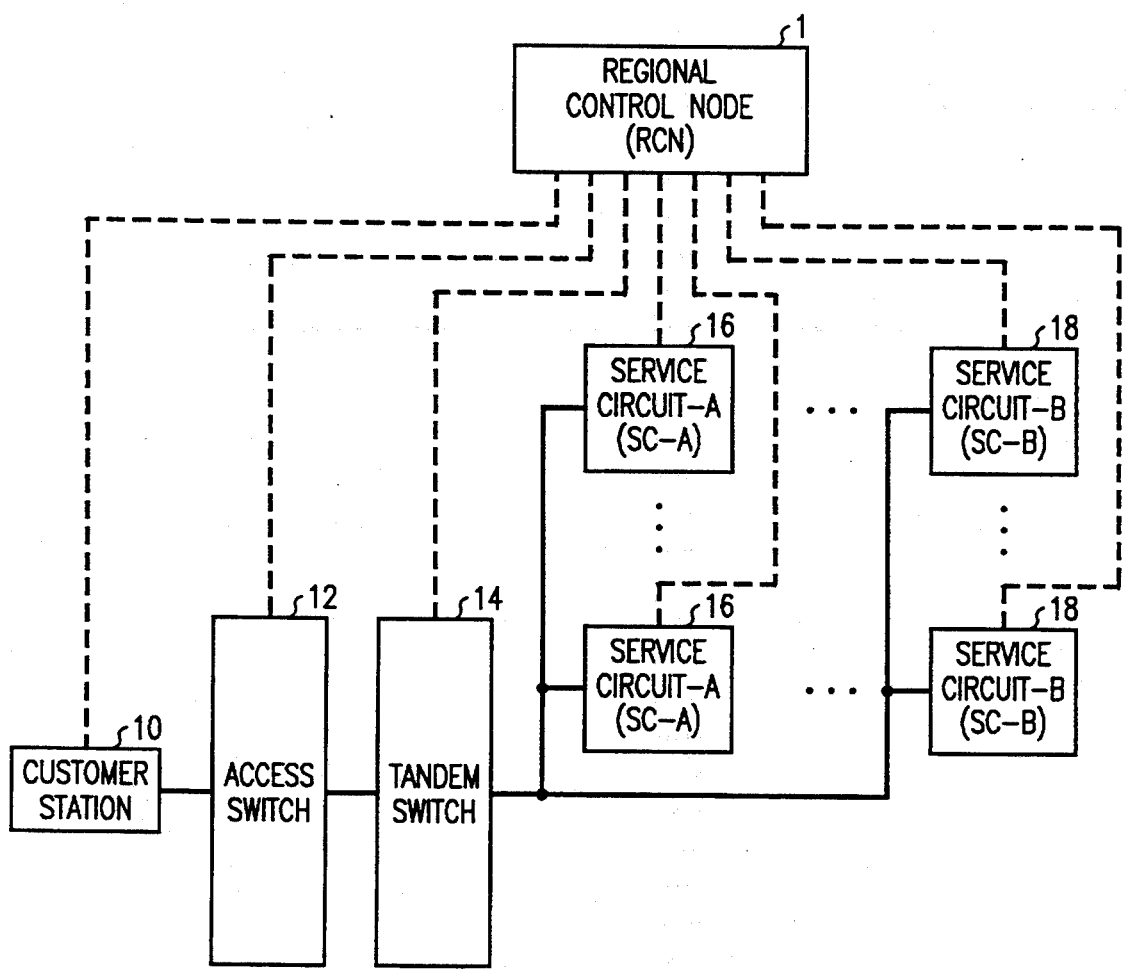
FIG. 1 is a block diagram illustrating the operation of applicants' invention.
Figure 3:
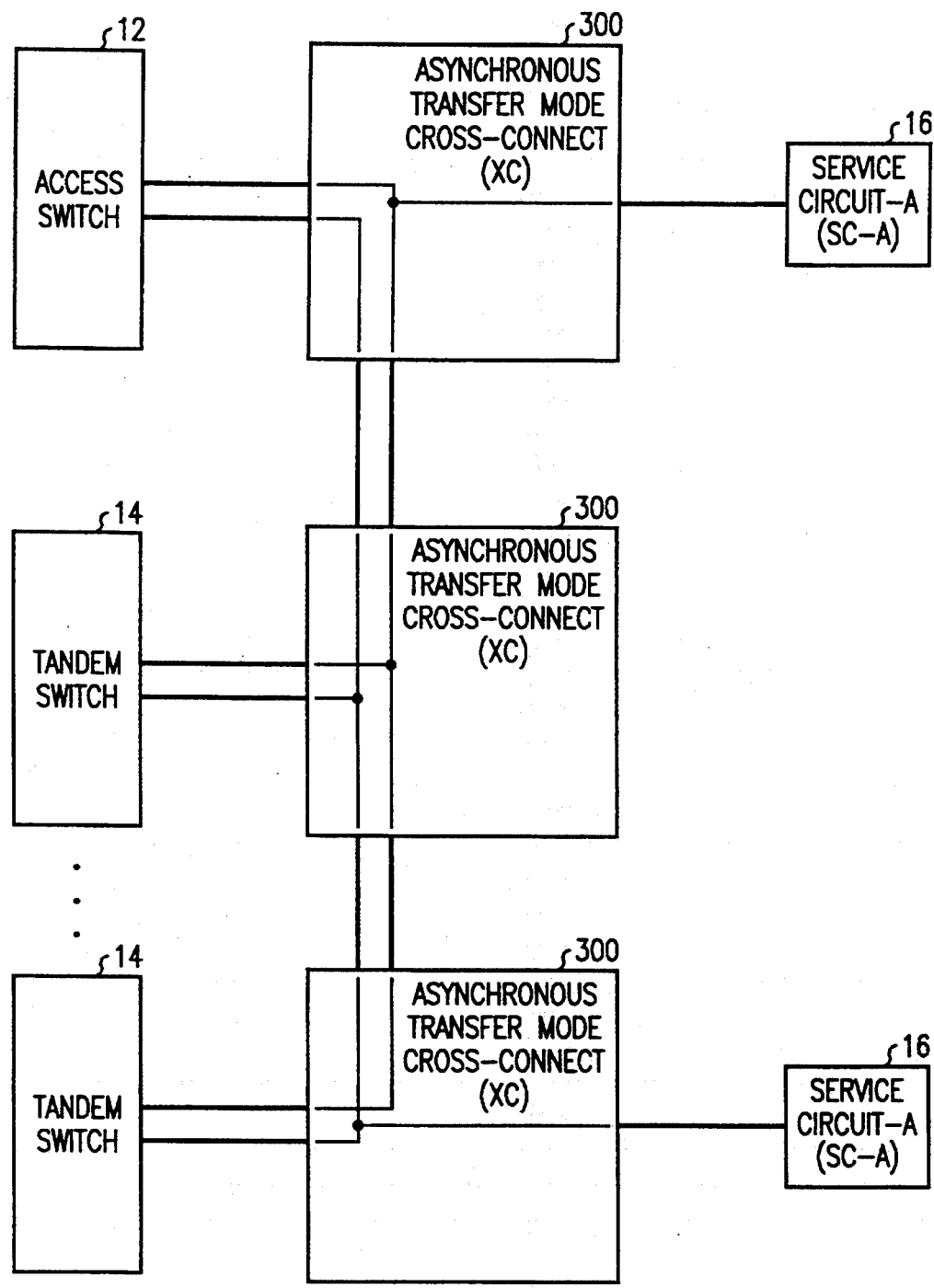
FIG. 3 is a diagram showing the interconnections between service circuits and switches.

FIG. 1 is a block diagram illustrating the operation of applicants' invention. The diagram is simplified to show only a single customer station, a single access switch, and a single tandem switch, although in practice a plurality of such customer stations, access switches, and tandem switches would be involved in a complex conference communication arrangement. The dashed lines are logical data links interconnecting two units for control information, and the solid lines represent communication signal flow, i.e., the voice and data signal path. A customer station 10 is connected to an access via an access switch 12 and a tandem switch 14 to one or more service circuits of which two types service circuit A 16 and service circuit B 18 are shown. Crossconnect systems (not shown) are usually placed between the access and tandem switches and, as shown in FIG. 3, between the tandem switches and the service circuits. A plurality of service circuits of type A and of type B are also shown. Service circuit A could be a very high fidelity (CD quality) audio bridge and service circuit B could be a high definition TV (HDTV) video bridge. Another example (not shown) is the control circuit for providing layer 4–7 control of access to a value added server, and the data link, if any, necessary to connect the control circuit to the accessed server. These types of service circuits are very expensive and therefore should be utilized as efficiently as possible. In accordance with the principles of this invention, such service circuits are provided in a pool on a regional basis so that a large number of service circuits is made available in common to all the switches of the region. The control of the use of the service circuits resides in a regional control node 1 which is connected via logical data links to the access switch which terminates signaling from customer premises equipment, such as customer station 10, the access switches, tandem switches and the service circuits under consideration. The logical data links are comprised of switchably interconnected physical links.

Figure 2:
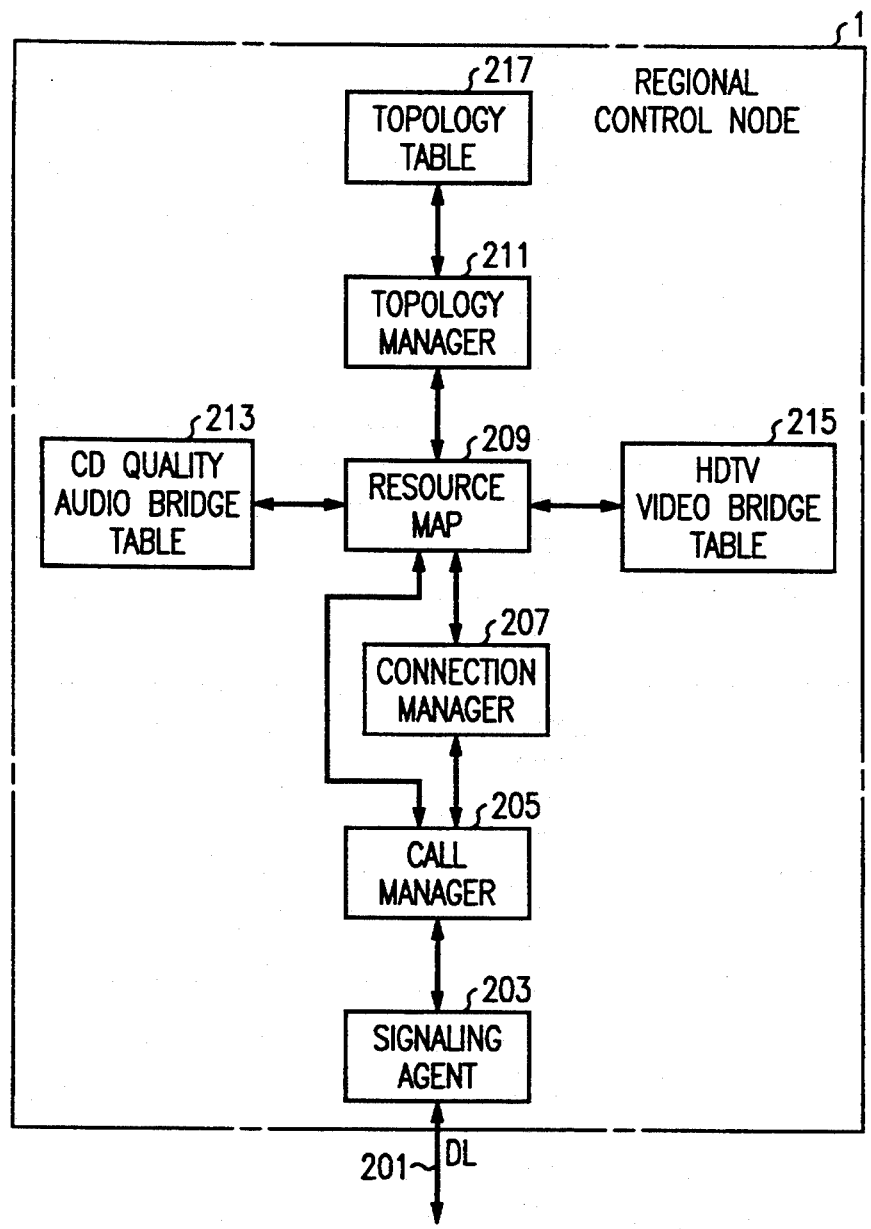
FIG. 2 is a more detailed block diagram of a regional control node used for implementing applicants' invention.

FIG. 2 shows details of the regional control node. The control node is accessed via a data link. Software for interfacing with the data link is the signaling agent 203. This agent communicates with the call manager 205 which is responsible for controlling the processes for adding and releasing resources such as the pooled service circuits to individual calls. The call manager maintains data describing the state of each call involving control by the regional control node. When the call manager recognizes that a resource, such as the service circuit, must be added to or disconnected from a call, it communicates a request to the connection manager 207. The connection manager first determines the affected connections in the call and requests the seizure or release of a resource from the resource manager 209. The resource manager consults availability tables, such as the CD quality audio bridge table 213 and the HDTV video bridge table 215, to determine which service circuits are available for meeting the request from the connection manager and consults topology manager 211 which consults the topology table 217 to determine which of the available service circuits use the fewest links between the service and the switch to which the service circuit is to be connected. The resource manager selects the appropriate service circuit and marks it unavailable in one of the tables 213, . . . , 215 and informs the connection manager 207. The connection manager determines the messages to be sent to the switches and the service circuits in order to establish the appropriate connection and passes this information to the call manager. The call manager updates its record of the call and sends the messages for causing the network connections to be established to the signaling agent 203 which distributes these messages via data link 201 to the appropriate switches and service circuits. While this description has shown tables, more general data bases can be used in a more general case for keeping track of availability, resource use, and topology. The topology manager is consulted before selecting an available service circuit as the most expeditious way of selecting an optimum available service circuit.

FIG. 3 is a block diagram showing the interconnections between switches and service circuits. The service circuits and switches are each connected to an ATM crossconnect unit 300. This crossconnect unit has recorded in its memory the identification of virtual paths for interconnecting a connected service circuit with a connected switch or another connected ATM crossconnect unit 300. If a particular connection is to be established, say between the service circuit and a switch, then the service circuit and switch are requested to transmit and receive over the virtual path used for this connection. If the connection requires an inter-crossconnect connection, then the service circuit is initialized to transmit and receive over a virtual path connected to the other crossconnect unit. If the service circuit in fact services a call using two or more switches, then the service circuit can be initialized with the identification of the permanent virtual circuit paths necessary for reaching both of these switches. Advantageously, as the need arises for additional transmission bandwidth between two nodes, the operation to provide this bandwidth is straightforward; only a few connection orders need be sent to the switches and crossconnect systems. Note that FIG. 3 is a logical diagram of the interconnections. In practice, each service circuit 16 is likely to have a single physical connection to the crossconnect unit 300 and this physical connection can be used for accessing any physical output of the crossconnect unit. Similarly, the switches 14 may only have a single connection to the crossconnect system 300, again, for accessing any output of the crossconnect unit. For multi-media services, different types of service circuits are connected to a call through different ATM crossconnect virtual paths.

Figure 4:
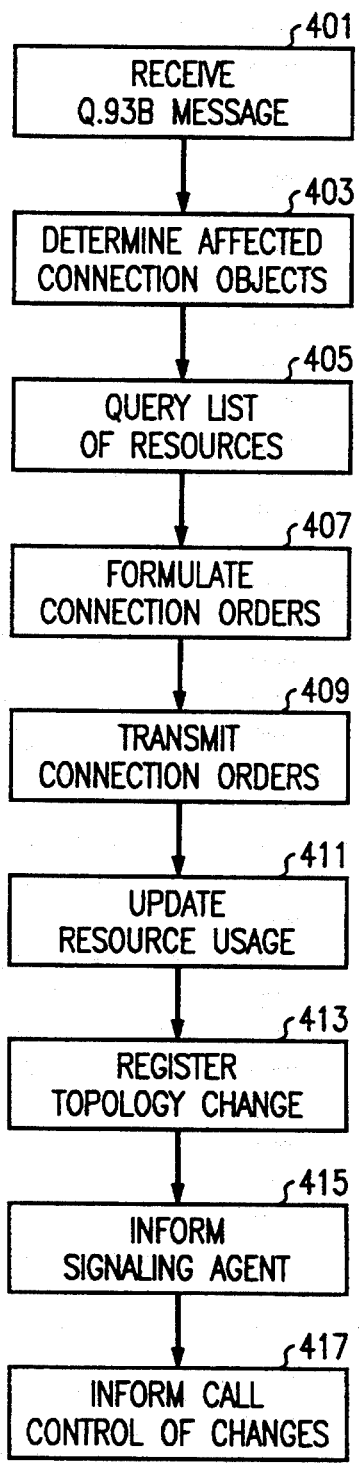
FIG. 4 is a flow diagram illustrating the operation of applicants' invention.

FIG. 4 is a flow diagram of the actions performed by the regional control node. The particular example relates to the addition of resources, such as a service circuit, to a call; the actions for release of resources or initial creation of a call are essentially the same. The process is started when a message is received from a customer via a logical data link from the customer's station 10. A message in this specific embodiment is a Q.93B message which is received over data link 201 by the signaling agent 203 (action block 401 ). The call manager and the connection manager determine what call and connectional objects (or equivalents of objects in alternate formal descriptions) will be affected by the request based on the data maintained by the call manager concerning the present state of the call and the connection manager based on the resources requested (action block 403). The resource manager in conjunction with the topology manager queries the list of available resources of the type requested and selects the most appropriate one based on information from the topology manager. The topology manager also has information for selecting an optimum trunk to connect a service circuit; this information is used by the connection manager in controlling establishment of connections. This information is presented to the connection manager which formulates the connection orders (action block 407). These order are then transmitted to the affected units such as the service circuits and the switches (action block 409) under the control of the signaling agent. The resource manager then updates the resource usage tables (i.e., the availability data of each of the service circuits) (action block 411). The call manager updates its record of the call configuration and connectivity topology of the call (action block 411). The signaling agent is informed of the changes so that it can inform the customer station of the change in the call configuration (action block 415). The call control is informed of changes in the call configuration (action block 4 17) or of the creation of a new call so that it can update its own call state tables. At this point the call configuration has been established in accordance with the customer's request. Now, the signaling agent informs the calling and called parties that their request has been met.

The basic program described in FIG. 4 can be used for adding and subtracting legs and service circuits from and to a call and can be used to update the availability tables in the RCN.

More generally, this arrangement is also used to allocate and control connection to transmission resources (bandwidth between nodes, individual trunks) to a call; the centralized allocation and control provides for a more optimum use of these resources, based on the needs of the entire regional telecommunications network, than is possible in the prior art distributed control of such resources.

It is to be understood that the above description is only of one preferred embodiment of the invention. Numerous other arrangements may be devised by one skilled in the art without departing from the scope of the invention. The invention is thus limited only as defined in the accompanying claims.

We claim:

1. In a regional telecommunications network, apparatus for associating members of a common pool of service circuits to a call served by any of a plurality of switching systems of said regional network, comprising:
    plurality of service circuits, in said common pool, each connectable to at least two of said plurality of switching systems; and
    a regional control node for selecting any of said plurality of service circuits and for controlling a connection of a selected service circuit to a call on any of said switching systems of said regional telecommunications network;
    wherein said regional control node selects said any service circuit using a topology manager to minimize resource use for connecting the selected service circuit to said call.

2. The apparatus of claim 1 wherein said resource use is minimized by selecting a service circuit connectable to said call using a minimum number of links.

3. A method of allocating a service circuit for a call, comprising the steps of:
    storing and updating, in a regional control node, availability data for a pool of service circuits serving a region;
    responsive to a request from any of a plurality of switching systems of said region, for a service circuit, selecting an available one of said pool of service circuits for serving said call; and
    controlling establishment of call connections between the selected service circuit and said call from said regional control node;
    wherein the step of selecting comprises:
        consulting a topology manager of said regional control node to minimize resource utilization for connecting the selected service circuit to the call.

4. A method of allocating a service circuit for a call, comprising the steps of:
    storing and updating, in a regional control node, availability data for a pool of service circuits serving a region;
    responsive to a request from any of a plurality of switching systems of said region, for a service circuit, selecting an available one of said pool of service circuits for serving said call; and
    controlling establishment of call connections between the selected service circuit and said call from said regional control node;
    wherein the step of selecting comprises selecting at least two different types of service circuits for serving a multi-media call;
    wherein call connections of at least two of said different types of service circuits use paths via different ones of said switching systems of said region.

5. In a regional telecommunications network comprising a plurality of nodes, apparatus for allocating transmission resources to a call served by any of a plurality of switching systems at ones of said nodes of said regional network, comprising:
    a plurality of transmission resources for interconnecting pairs of said nodes of said network;
    a regional control node for selecting ones of said plurality of transmission resources and for controlling a connection of a selected transmission resource to a call on said regional telecommunications network;
    wherein said regional control node selects said transmission resources for said call using a topology manager to minimize transmission resource use for said call.

6. A method of allocating transmission resources of a regional telecommunications network to a call, comprising the steps of:
    maintaining, in a regional control node, availability data for said transmission resources for interconnecting nodes of said network;
    responsive to a request from any switching system of said region, for a transmission resource, selecting an available transmission resource for serving said call; and
    controlling establishment of call connections using said selected transmission resource from said regional control node;
    wherein the step of selecting comprises consulting a topology manager of said regional control node to minimize transmission resource use for said call.

* * * * *